US009169081B1

(12) United States Patent
Harrison et al.

(10) Patent No.: US 9,169,081 B1
(45) Date of Patent: Oct. 27, 2015

(54) BULK MATERIAL CONVEYOR BELT SCRAPER AND METHOD OF FORMING THE SAME

(71) Applicant: Martin Engineering Company, Neponset, IL (US)

(72) Inventors: Paul B. Harrison, Neponset, IL (US); Edwin H. Peterson, Neponset, IL (US)

(73) Assignee: Martin Engineering Company, Neponset, IL (US)

( * ) Notice: Subject to any disclaimer, the term of this patent is extended or adjusted under 35 U.S.C. 154(b) by 0 days.

(21) Appl. No.: 14/466,574

(22) Filed: Aug. 22, 2014

(51) Int. Cl.
*B65G 45/12* (2006.01)
*B65G 45/16* (2006.01)
*B23K 31/02* (2006.01)
*B32B 37/18* (2006.01)

(52) U.S. Cl.
CPC ............ *B65G 45/12* (2013.01); *B23K 31/02* (2013.01); *B32B 37/18* (2013.01); *B65G 45/16* (2013.01); *B32B 2413/00* (2013.01)

(58) Field of Classification Search
CPC ......... B65G 45/12; B65G 45/14; B65G 45/16
USPC .................................. 198/497–499
See application file for complete search history.

(56) References Cited

U.S. PATENT DOCUMENTS

| 4,927,003 A * | 5/1990 | Swinderman | B65G 45/12 15/256.5 |
| 4,953,689 A * | 9/1990 | Peterson | B65G 45/16 15/256.51 |
| 6,321,901 B1 | 11/2001 | Strebel et al. | |
| 7,007,794 B2 | 3/2006 | Waters et al. | |
| 8,028,819 B1 | 10/2011 | Swinderman | |
| 2009/0032371 A1* | 2/2009 | Hoessl | B65G 45/12 198/497 |
| 2009/0218196 A1* | 9/2009 | Gronvall | B29C 70/68 198/497 |
| 2011/0192705 A1* | 8/2011 | Kotze | B65G 45/16 198/497 |
| 2013/0026008 A1* | 1/2013 | Childs et al. | B65G 45/12 198/497 |

OTHER PUBLICATIONS

U.S. Appl. No. 60/124,724, filed Mar. 17, 1999.

* cited by examiner

*Primary Examiner* — Mark A Deuble
(74) *Attorney, Agent, or Firm* — Thompson Coburn LLP; Clyde L. Smith

(57) ABSTRACT

A bulk material conveyor belt scraper comprises a base portion having a C-channel. The belt scraper also comprises a polymeric portion that protrudes outwardly from a corner of the C-channel. The C-channel of the belt scraper is adapted to engage with and partially encircle a support member having a square portion in a manner such that the support member is able to bias the belt scraper against a conveyor belt.

16 Claims, 5 Drawing Sheets

BULK MATERIAL CONVEYOR BELT SCRAPER AND METHOD OF FORMING THE SAME

CROSS-REFERENCE TO RELATED APPLICATIONS

Not Applicable.

STATEMENT REGARDING FEDERALLY SPONSORED RESEARCH OR DEVELOPMENT

Not Applicable.

APPENDIX

Not Applicable.

BACKGROUND OF THE INVENTION

1. Field of the Invention

The present invention pertains to bulk material conveyor belt scrapers. More specifically, the present invention pertains to a belt scraper that has a polymeric portion and a metal base portion. The metal base portion comprises an opening that extends longitudinally through the metal base portion.

2. General Background

Conveyor belt scrapers are used to remove bulk material clinging to conveyor belts. Belt scrapers are typically provided at the head of conveyor belt assemblies and most are configured to slideably engage with the moving belt to thereby scrape clinging material from the belt. As such, belt scrapers continuously wear and periodically need to be replaced. Thus, the serviceability of belt scraper assemblies is a major factor in selecting a belt scraper assembly. Likewise, the cost of replacement scrapers is a significant factor in the selection of belt scraper assemblies.

SUMMARY OF THE INVENTION

The present invention is directed to a belt scraper that can be easily replaced and even cut to length at a job site. Moreover, the belt scrapers of the present invention can be fabricated efficiently, thereby reducing their cost.

In one aspect of the invention, a bulk material conveyor belt scraper comprises a polymeric portion and a metal base portion. The belt scraper extends longitudinally along a longitudinal axis. The base portion comprises a C-channel portion and a protrusion that extends along the longitudinal axis. The protrusion extends outwardly from a corner of the C-channel portion and defines an opening that extends longitudinally through the base portion of the conveyor belt scraper. The polymeric portion is attached to at least the protrusion of the base portion.

In another aspect of the invention, a bulk material conveyor belt scraper assembly comprises a support member that extends along a longitudinal axis and a belt scraper. The support member comprises a square opening extending longitudinally through the support member. The support member also comprises a longitudinally extending stiffening rib protruding from a corner of the support member. The belt scraper comprises a base portion having a C-channel. The belt scraper also comprises a polymeric portion that protrudes outwardly from a corner of the C-channel. The C-channel of the belt scraper is engaged with and partially encircles the support member in a manner such that the polymeric portion of the belt scraper extends opposite the stiffening rib.

In yet another aspect of the invention, a method of forming a bulk material conveyor belt scraper comprises welding a first metal channel to a second metal channel. The first channel is a C-channel having an exterior corner. The first metal channel is welded to the second metal channel in a manner such that the second metal channel bridges over the exterior corner of the first metal channel and forms a channel passageway bound by the first and second metal channels. The method further comprises bonding a polymeric material to the second channel after welding the first and second metal channels to each other.

Further features and advantages of the present invention, as well as the operation of the invention, are described in detail below with reference to the accompanying drawings.

Figure 1:
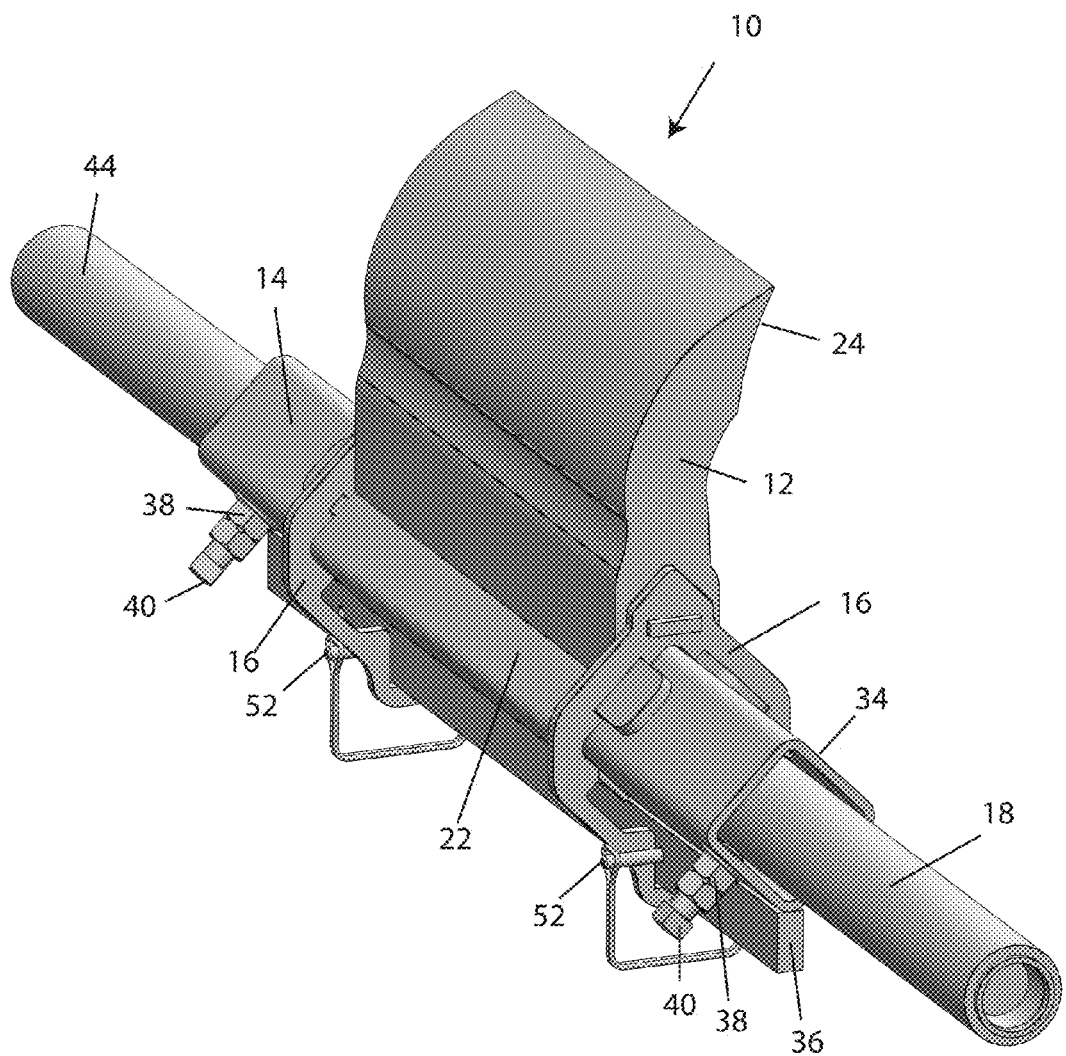
FIG. 1 depicts a perspective view of a bulk material conveyor belt scraper assembly.

Reference numerals in the written specification and in the drawing figures indicate corresponding items.

DETAILED DESCRIPTION

A bulk material conveyor belt scraper assembly 10 in accordance with the invention is shown in FIG. 1. The belt scraper assembly 10 comprises, among other things, a belt scraper 12, a support member 14, securing members 16, and a torsion bar 18.

Figure 2:
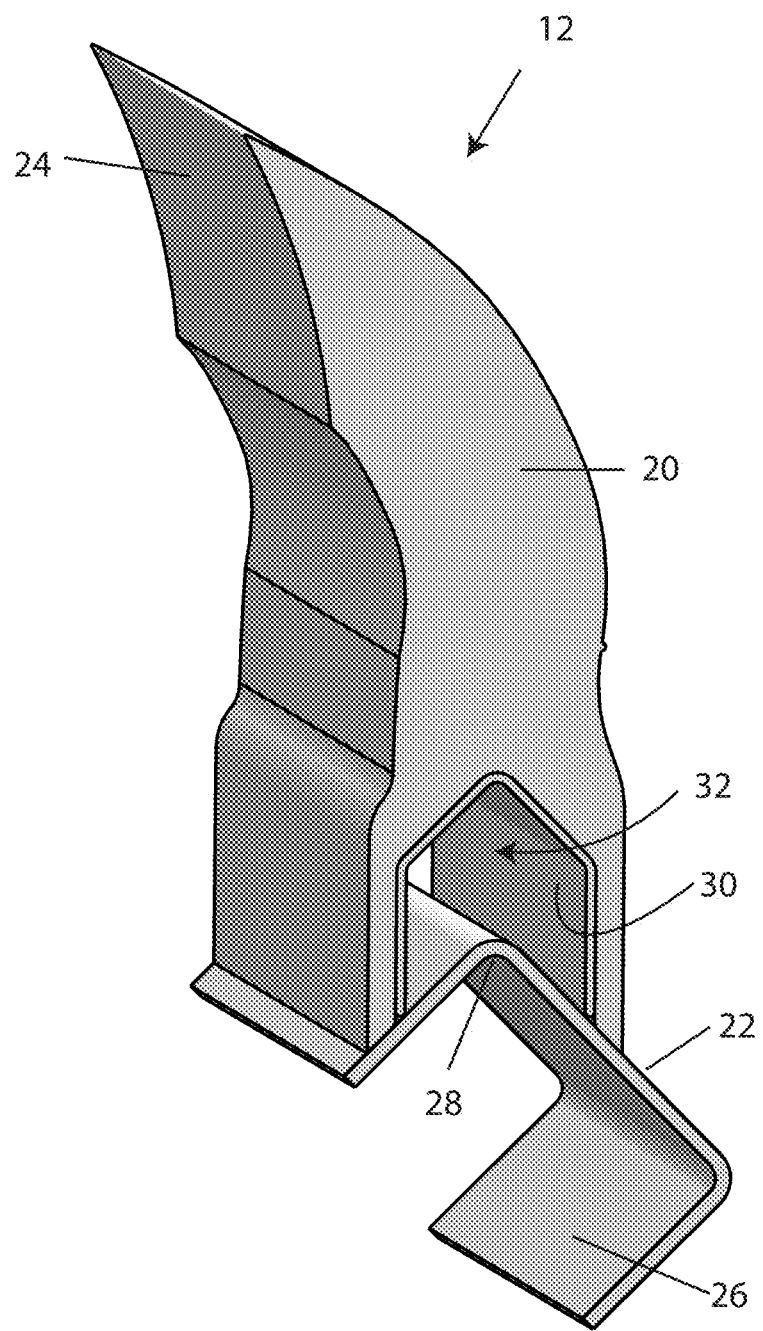
FIG. 2 depicts a perspective view of the belt scraper of the assembly shown in FIG. 1.

The belt scraper 12 is shown by itself in FIG. 2. The belt scraper 12 comprises a polymeric portion 20 and a base portion 22. The polymeric portion 20 is preferably formed of a polyester or polyether material that is over-molded onto the base portion 22. The polymeric portion 20 is preferably chemically cured rather than heat cured, although it could be cured in any manner. The belt scraper 12 also comprises a wear tip 24 opposite the base portion 22. The wear tip 24 is preferably formed by the polymeric portion 20 of the belt scraper 12 and is configured and adapted to engage and slide against a moving conveyor belt to remove bulk material clinging to the belt. Alternatively, the belt scraper 12 may comprise a wear tip insert (not shown) formed out of a different material, such as a tungsten carbide, which can be over-molded by the polymeric portion 20. The resilient nature of the polymeric portion 20 allows wear tip 24 to ride over discontinuities of a typical conveyor belt, without imparting appreciable rotational oscillation to the base portion 22 of the belt scraper 12.

The base portion 22 of the belt scraper 12 is preferably formed of metal. More preferably, the base portion 22 is formed by welding two channel members of metal to each other along their lengths. The first channel member 26 is preferably a standard C-channel having three perpendicular portions. Two of the perpendicular portions intersect at primary corner 28. The second channel member 30 is preferably also a C-channel, except having four portions oriented at forty-five degrees relative to each other. The second channel member 30 preferably straddles the primary corner 28 of the first channel member 26. Thus, a chevron-shaped opening 32 extends longitudinally through the base portion 22 of the belt scraper 12 and is bound by the first and second channel members 26, 30 (albeit the cross-sectional shape of the opening could vary depending on the shapes of the first and second channel members 26, 30). After welding the first and second channel members 26, 30 to each other, the base portion 22 is then placed partially in a mold and the polymeric portion 20 is molded thereon. The polymeric portion 20 becomes adhered to the second channel member 30, and preferably also to the first channel member 26. Although the base portion 22 of the belt scraper is preferably formed by welding two C-channel members to each other, it should be appreciated that it could also be formed via a custom extrusion. It should also be appreciated that the second channel member 30 can occupy space that otherwise would typically be occupied by the polymeric portion 20. Thus, the second channel member 30 both torsionally supports the polymeric portion 20 and reduces the amount of polymeric material, and therefore material cost, required to fabricate the polymeric portion.

The support member 14 comprises a tube portion 34 and a stiffening rib 36. The tube portion 34 preferably has a square cross-section. The stiffening rib 36 preferably extends outwardly from one of the corners of the tube portion 34. In the embodiment shown in FIGS. 1 and 4, the stiffening rib 36 is merely a piece of sheet or plate material that is welded along the length of the tube portion 34. However, the tube portion 34 and the stiffening rib 36 can be formed in other ways. For example, FIG. 5 depicts another embodiment of the support member 14' that is roll forged from an extruded cylindrical tube of material. The stiffening rib 36 increases the bending stiffness of the support member 14 and is configured to carrying primarily tension. The tube portion 34 is dimensioned to interlock with the first channel member 26 of the belt scraper 12 as shown such that the support member is able to exert a torque (about the longitudinal axis of the support member 14) on the belt scraper to bias the wear tip 24 of the belt scraper against a conveyor belt. The support member 14 also preferably comprises a plurality of set fittings 38 which, along with set screws 40, secure the support member 14 to the torsion bar 18.

Figure 4:
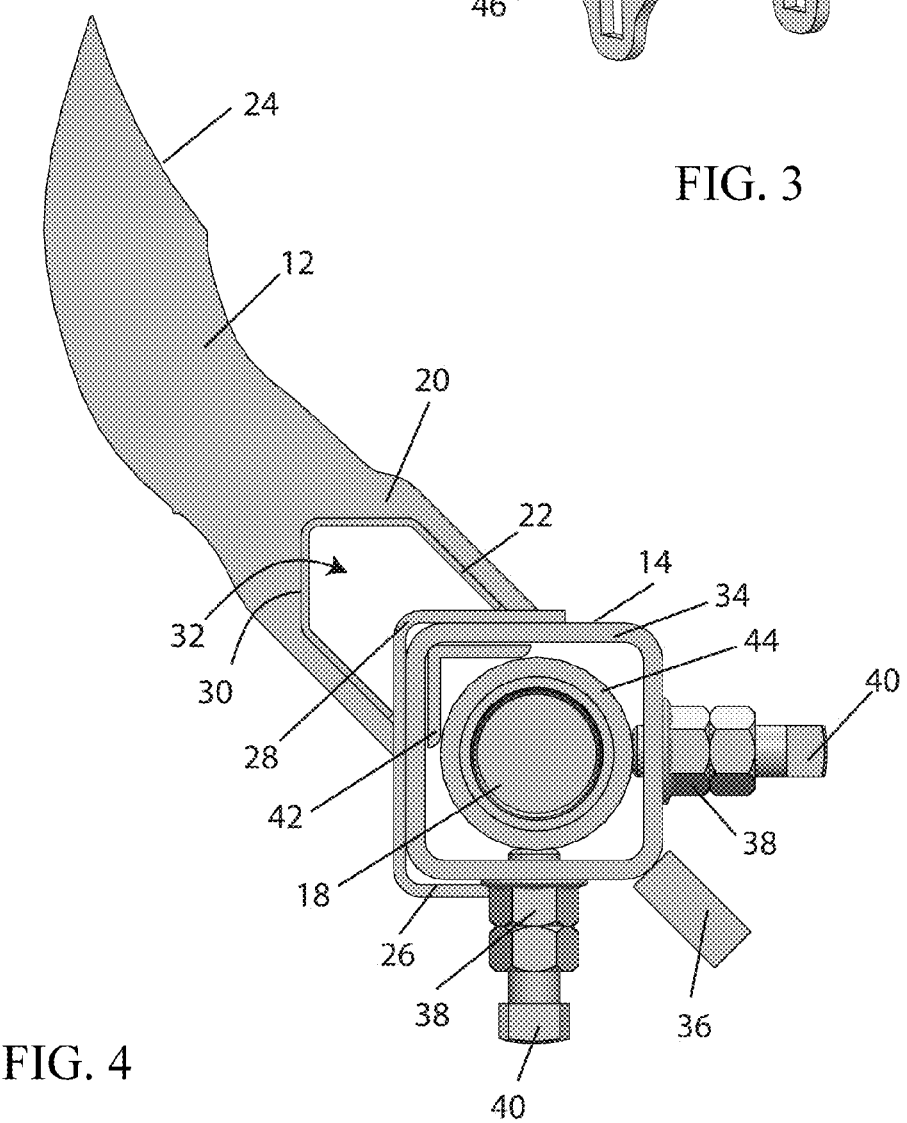
FIG. 4 depicts a side view of the assembly shown in FIG. 1 as viewed parallel to the longitudinal axis of the belt scraper.
Figure 5:
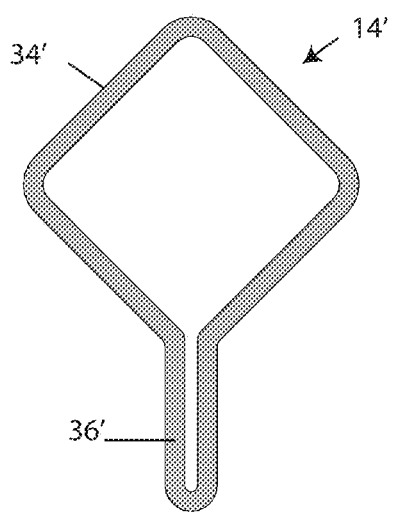
FIG. 5 depicts a roll formed version of a support member that is configured to engage with the belt scraper shown in FIG. 2.

As shown in FIG. 4, the torsion bar 18 is generally cylindrical but also comprises an angle iron 42 extending along its longitudinal length. The angle iron 42 is preferably welded to the cylindrical portion 44 of the torsion bar 18 and prevents rotation between the torsion bar and the support member 14. The set screws 40 of the support member 14 prevent the support member from sliding longitudinally relative to the torsion bar 18.

Figure 3:
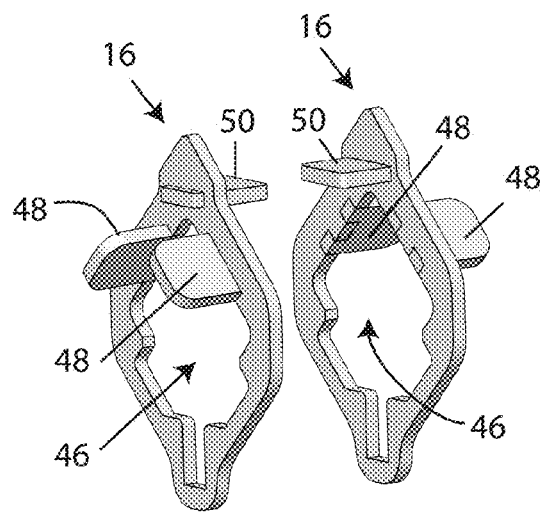
FIG. 3 depicts the locking members of the assembly shown in FIG. 1.

The belt scraper 12 is secured to the support member by the securing members 16, which are shown by themselves in FIG. 3. Each securing member 16 comprises an opening 46 configured to encircle the support member 14. Each securing member 16 also comprises a pair of bracing tabs 48 and a locking tab 50. The bracing tabs 48 are configured to bare against the support member 14 in a manner preventing the securing members 16 from rocking outboard when the securing members are locked in place adjacent to the belt scraper 12. The bracing tabs 48 also make it more easy to slide the securing members 16 onto the support member 14 when assembling the securing members to the scraper assembly 10. The locking tabs 50 of the securing members 16 are configured to extend into the opposite ends of the longitudinal opening 32 that extends through the base portion 22 of the belt scraper 12 to thereby secure the belt scraper 12 to the support member 14. However, the locking tabs 50 of the securing members 16 only loosely extend into the opening 32 of the belt scraper 12 and therefore the securing members are not configured to carry the primary belt scraping loads. The primary belt scraping loads are instead carried by contact forces between the first channel member 26 of the base portion 22 of the belt scraper 12 and the support member 14. Releasable locking pins 52 preferably extend through the stiffening rib 36 of the support member 14 to longitudinally secure the securing members 16 in place along the support member.

Figure 6:
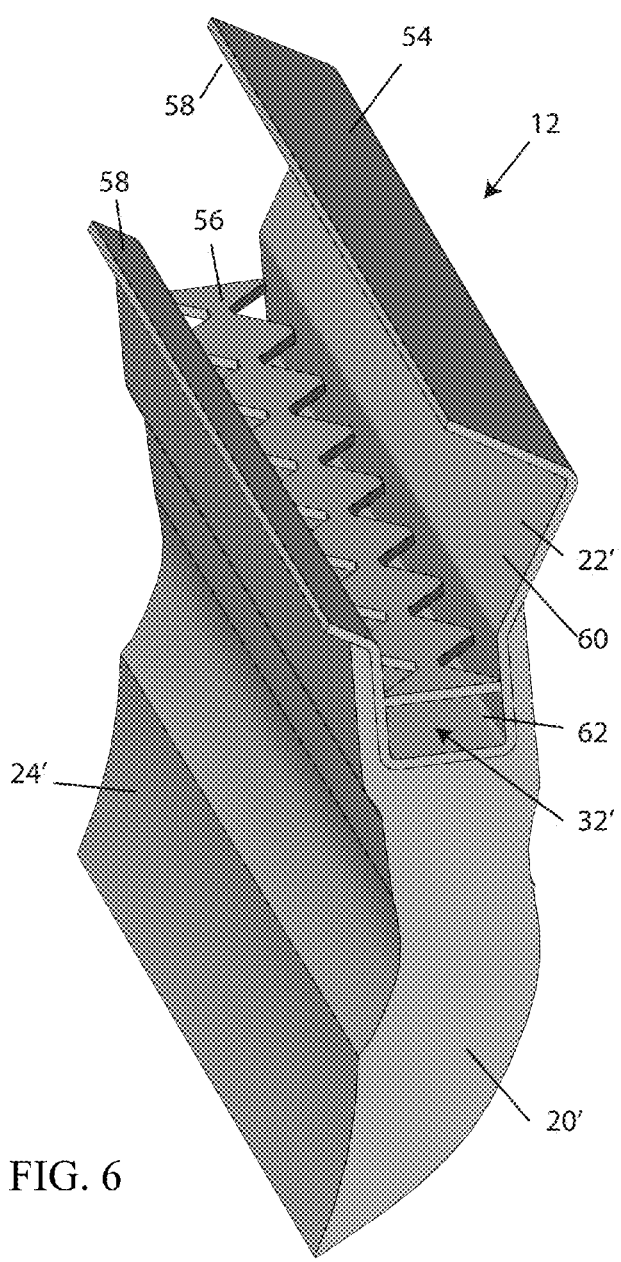
FIG. 6 depicts an alternative embodiment of the belt scraper.
Figure 7:
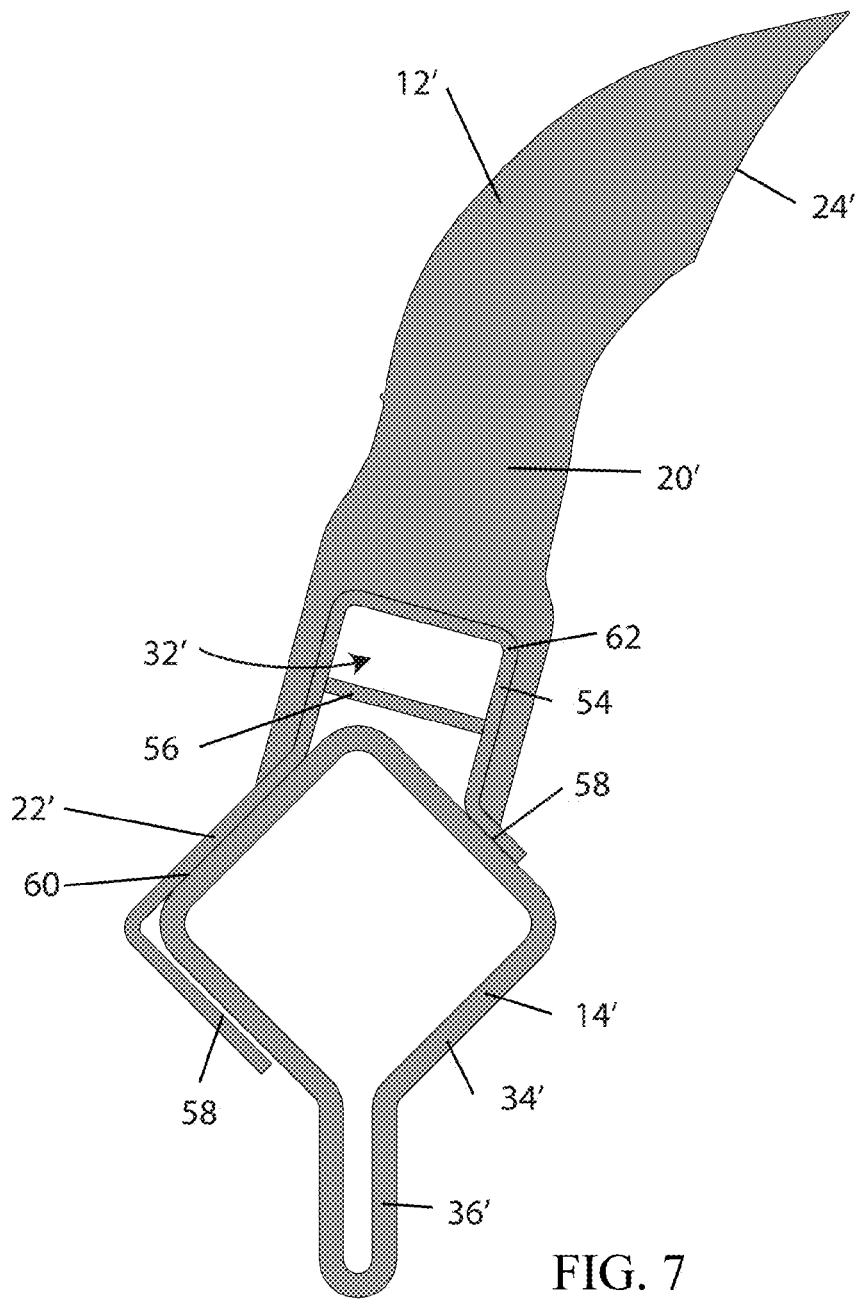
FIG. 7 depicts a side view of an assembly of the belt scraper shown in FIG. 6 mounted on the support member shown in FIG. 5 as viewed parallel to the longitudinal axis of the belt scraper.

Alternative embodiment of a belt scraper 12' is shown in FIG. 6. This belt scraper 12' is interchangeable with the belt scraper described above but has a different base portion 22' that comprises a roll forged portion 54 and a brace 56. The polymeric portion 20' of the belt scraper 12' is essentially the same as that of the other embodiment. The roll forged portion 54 of the base portion 22' of the belt scraper 12' is roll formed from flat sheet stock such that it has two opposing engagement surfaces 58 and an intermediate engagement surface 60 perpendicular thereto that collectively are configured to act as a C-channel and engage three sides of the square portion of a support member 14, 14'. The rolling also forms a channeled protrusion 62 configured to extend outward from a corner of such a square portion of a support member 14, 14' when the belt scraper is attached thereto. The brace 56 is formed separately and is welded across the channel portion of the protrusion 62. The brace 56 as shown has undulating side edges to reduce the amount of material required to form the brace and to maximize the number of braces that can be cut from a single sheet of material (preferably via laser cutting). The brace 56 prevents the opposite side of the protrusion 62 from spreading apart when the belt scraper 12' is under load. As shown in FIG. 7, the brace 56 is positioned such that the base portion 22' of the belt scraper 12', like the other embodiment of a belt scraper described above, comprises an opening 32 extending longitudinally through the base portion that is configured to receive the locking tabs 50 of the securing members 16.

In view of the configurations of the conveyor belt scraper assembly 10 as described above, it should be appreciated that the belt scraper 12 can be cut to length from a longer belt scraper and can be quickly replaced when worn. Furthermore, in view of the foregoing, it should be appreciated that the invention has several advantages over the prior art.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

It should also be understood that when introducing elements of the present invention in the claims or in the above description of exemplary embodiments of the invention, the terms "comprising," "including," and "having" are intended to be open-ended and mean that there may be additional elements other than the listed elements. Additionally, the term "portion" should be construed as meaning some or all of the item or element that it qualifies. Moreover, use of identifiers such as first, second, and third should not be construed in a manner imposing any relative position or time sequence between limitations. Still further, the order in which the steps of any method claim that follows are presented should not be construed in a manner limiting the order in which such steps must be performed, unless such an order is inherent or explicit.

What is claimed is:

1. A bulk material conveyor belt scraper comprising a polymeric portion and a metal base portion, the belt scraper extending longitudinally along a longitudinal axis, the base portion comprising a C-channel portion and a protrusion that extends along the longitudinal axis, the C-channel portion having a corner, the protrusion extending outwardly from the corner of the C-channel portion and defining an opening that extends longitudinally through the base portion of the conveyor belt scraper, the polymeric portion being attached to at least the protrusion of the base portion.

2. A bulk material conveyor belt scraper in accordance with claim 1 wherein the protrusion of the base portion is welded to the C-channel portion of the base portion.

3. A bulk material conveyor belt scraper in accordance with claim 2 wherein the protrusion of the base portion is a channel member.

4. A bulk material conveyor belt scraper in accordance with claim 1 wherein the polymeric portion of the belt scraper is formed of polyether or polyester and is configured to scrape against a bulk material conveyor belt.

5. A bulk material conveyor belt scraper comprising a polymeric portion and a metal base portion, the belt scraper extending longitudinally along a longitudinal axis, the base portion comprising two opposing engagement surfaces and an intermediate engagement surface perpendicular thereto, two opposing engagement surfaces and the intermediate surface being configured to engage against three sides of a square tube in a manner preventing the belt scraper from rotating relative to the square tube, the base portion also having a protruding portion that extends the length of the belt scraper and is configured to extend outwardly of a corner of a square tube when the belt scraper is attached to such a square tube, the protrusion forming an opening or channel that extends the length of the belt scraper, the polymeric portion being attached to at least the protrusion of the base portion.

6. A bulk material conveyor belt scraper assembly comprising a support member extending along a longitudinal axis and a belt scraper, the support member comprising a square opening extending longitudinally through the support member, the support member also comprising a longitudinally extending stiffening rib protruding from a corner of the support member, the belt scraper comprising a base portion having a C-channel, the belt scraper also comprising a polymeric portion that protrudes outwardly from a corner of the C-channel, the C-channel of the belt scraper being engaged with and partially encircling the support member in a manner such that the polymeric portion of the belt scraper extends opposite the stiffening rib.

7. A bulk material conveyor belt scraper assembly in accordance with claim 6 wherein the base portion of the belt scraper comprises a second channel that bridges the corner of the C-channel and forms an opening, and the polymeric portion is secured to the second channel.

8. A bulk material conveyor belt scraper assembly in accordance with claim 7 wherein the base portion of the belt scraper comprises welds that secure the C-channel and the second channel to each other.

9. A bulk material conveyor belt scraper assembly in accordance with claim 7 comprising a pair of locking members, each of the locking members comprising a protrusion and being configured and adapted to slideably attach to the support member, the protrusions of the locking members being configured to at least partially extend into the opening of the opening of the belt scraper from opposite sides of the belt scraper in a manner securing the belt scraper to the support member.

10. A bulk material conveyor belt scraper assembly in accordance with claim 6 wherein the bulk material conveyor belt scraper assembly comprises a torsion bar extending through the square opening of the support member, the torsion bar comprising a cylindrical portion and an angle iron portion, the angle iron portion is welded to the cylindrical portion and rotationally interlocks with the support member in a manner preventing rotation between the torsion bar and the support member.

11. A bulk material conveyor belt scraper assembly in accordance with claim 6 wherein the support member comprises a square tube section that forms the square opening, and the stiffening rib and the square tube section are formed from an integral and homogenous piece of material.

12. A bulk material conveyor belt scraper assembly in accordance with claim 11 wherein the square tube section and the stiffening rib are collectively roll forged from a cylindrical tube of material.

13. A method of forming a bulk material conveyor belt scraper comprising:
    welding a first metal channel to a second metal channel, the first channel being a C-channel having an exterior corner, the first metal channel being welded to the second metal channel in a manner such that the second metal channel bridges over the exterior corner of the first metal channel and forms a channel passageway bound by the first and second metal channels; and
    bonding a polymeric material to the second channel after welding the first and second metal channels to each other.

14. A method in accordance with claim 13 wherein at least a portion of the second channel is partially positioned in a mold and the polymeric material solidifies in the mold in a manner bonding a polymeric material to the second channel.

15. A method in accordance with claim 13 wherein the polymeric material extends over the second metal channel and is bonded to the first metal channel.

16. A method in accordance with claim 13 wherein the conveyor belt scraper comprises a wear tip that is adapted and configured to slide against a moving conveyor belt and the polymeric material forms the wear tip.

* * * * *